United States Patent
Koonath et al.

(10) Patent No.: US 11,789,149 B2
(45) Date of Patent: Oct. 17, 2023

(54) POLARIZATION SEPARATION IN REMOTE IMAGING SYSTEMS

(71) Applicant: SiLC Technologies, Inc., Monrovia, CA (US)

(72) Inventors: Prakash Koonath, La Crescenta, CA (US); Shuren Hu, Arcadia, CA (US); Mehdi Asghari, La Canada Flintridge, CA (US); Bradley Jonathan Luff, La Canada Flintridge, CA (US); Behnam Behroozpour, South San Francisco, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 550 days.

(21) Appl. No.: 17/062,618

(22) Filed: Oct. 4, 2020

(65) Prior Publication Data
US 2022/0107411 A1    Apr. 7, 2022

(51) Int. Cl.
*G01C 3/08* (2006.01)
*G01S 17/32* (2020.01)
(Continued)

(52) U.S. Cl.
CPC .............. *G01S 17/32* (2013.01); *G01S 7/481* (2013.01); *G01S 7/4817* (2013.01); *G01S 7/499* (2013.01);
(Continued)

(58) Field of Classification Search
None
See application file for complete search history.

(56) References Cited

U.S. PATENT DOCUMENTS 11,454,724 B2 * 9/2022 Michaels ................ G01S 7/481
2005/0244103 A1   11/2005 Kwakernaak
(Continued)

FOREIGN PATENT DOCUMENTS

CN        110161516 A  *  8/2019  ............ G01S 7/487
WO   WO 2021252894 A1 * 12/2021  ............ G01S 7/497

OTHER PUBLICATIONS

Doherty, Fiona, International Preliminary Report on Patentability and Written Opinion, PCT/US2021/052485, The International Bureau of WIPO, dated Apr. 13, 2023.
(Continued)

*Primary Examiner* — Mark Hellner
(74) *Attorney, Agent, or Firm* — Gavrilovich, Dodd & Lindsey LLP

(57) ABSTRACT

Systems and methods described herein are directed to polarization separation of laser signals and/or incoming light signals associated with an imaging system, such as a Light Detection and Ranging (LIDAR) system. Example embodiments describe a system configured to direct incoming light signals to a polarization separator and capturing the two polarization states of the incoming light signals. In some instances, the laser signal may be converted into two different polarization states. The system may individually process the two polarization states of the incoming light signals along with the corresponding polarization state of the laser reference signal to extract information associated with reflecting objects within the field-of-view of the imaging system. The polarization separator may be a birefringent crystal positioned adjacent to an edge of a photonic integrated circuit (PIC) that is used for processing outgoing and incoming light signals associated with the imaging system.

10 Claims, 9 Drawing Sheets

800

(51) Int. Cl.
    *G02F 1/01*     (2006.01)
    *G01S 7/481*    (2006.01)
    *G01S 7/499*    (2006.01)
    *G02B 6/28*     (2006.01)
    *G02B 6/27*     (2006.01)
    *G02B 6/12*     (2006.01)

(52) U.S. Cl.
    CPC ....... *G02B 6/12004* (2013.01); *G02B 6/2773* (2013.01); *G02B 6/2813* (2013.01); *G02F 1/0136* (2013.01)

(56) References Cited

U.S. PATENT DOCUMENTS

| | | |
|---|---|---|
| 2017/0108649 A1 | 4/2017 | Dallessasse et al. |
| 2020/0088876 A1 | 3/2020 | Tanemura et al. |
| 2020/0150241 A1* | 5/2020 | Byrnes .................. G01S 7/4818 |

OTHER PUBLICATIONS

Thomas, Shane, International Search Report and Written Opinion, PCT/US2021/052485, International Searching Authority, United States Patent and Trademark Office, dated Mar. 18, 2022.

* cited by examiner

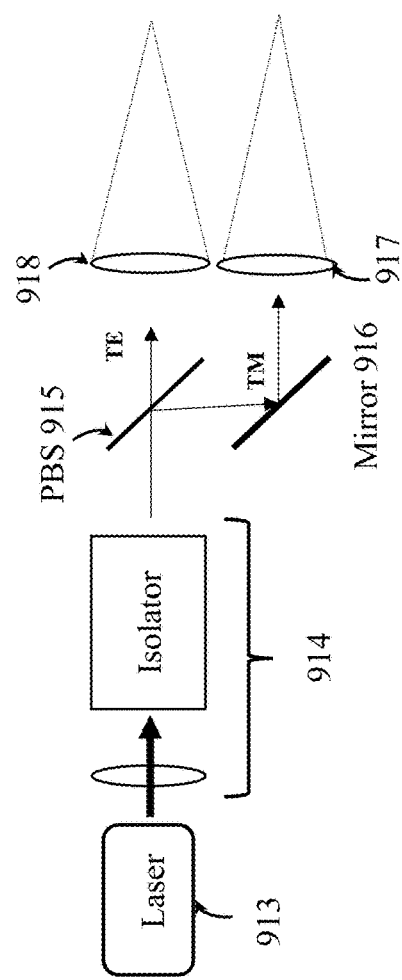
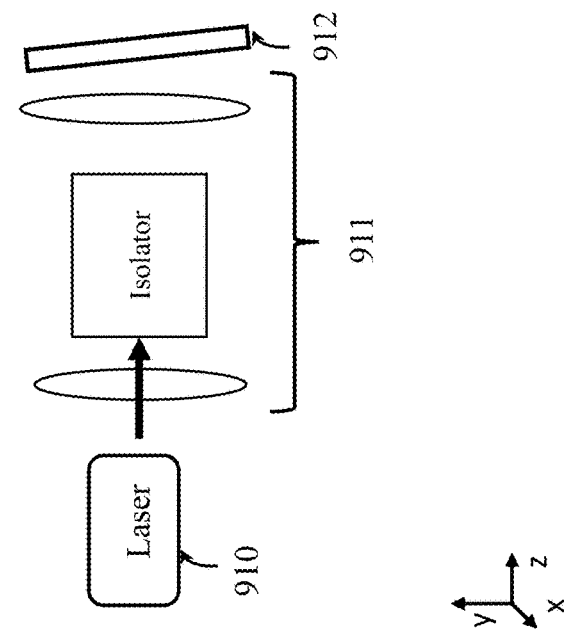
Figure 9B
Figure 9A

POLARIZATION SEPARATION IN REMOTE IMAGING SYSTEMS

FIELD

The invention relates to imaging systems. In particular, the invention relates to frequency modulated continuous wave (FMCW) based LIDAR (Light Detection and Ranging) systems.

BACKGROUND

Recent advances in integrated photonics have provided a platform for designing imaging systems with improved form factors, low loss, and high-speed operation. For example, LIDAR systems with integrated on-chip lasers, photonic components such as waveguides, and electronics are paving the way for a revolution in autonomous imaging applications spanning unmanned vehicles, drones, autonomous robots, and other imaging fields. In particular, FMCW based LIDARs have emerged as a leading imaging technology that is immune to ambient light interference and provides several data metrics for each imaging pixel, such as velocity, depth, and polarization information associated with reflected light beams.

However, a potential drawback for FMCW based LIDARs may be associated with loss of signal capture with increasingly high-speed operation of the scanner systems. For example, some micro-electro-mechanical (MEMS) scanners include one or more mirror(s) configured to continuously rotate while using laser output beams to scan a target field-of-view (FOV). FMCW based LIDAR systems that rely on photonic integrated circuits (PICs) with reduced form factors often have micron sized input facets for receiving reflected laser beams. While passive external optics (e.g., lenses) with large apertures may be able to capture a majority of the reflected laser beams, these beams need to be routed through the scanner mirror(s) for reaching a corresponding input facet of the PIC. The continuous motion of the mirror(s) can instead direct some of the incoming laser beams away the corresponding input facet, thereby causing loss of return signal capture. This phenomenon, in which a return signal from the same FOV as an incident light beam, is directed away from the input facet of the imaging device, may be referred to as "walk-off" The loss of photons associated with return signals can degrade the performance of FMCW LIDARs by limiting scan speeds, range of operation, and reduced signal-to-noise ratio (SNR).

FMCW systems incorporating walk-off mitigation may rely on multiple input facets for capturing signals returning at different time intervals and at different angles. The multiple input facets can then capture a greater portion of the returning photons that would otherwise have been lost. For obtaining polarization specific information associated with these photons, FMCW systems may can include a polarization separator element that can split an incoming or return signal into two polarization components, namely a transverse electric (TE) component and a transverse magnetic (TM) component. This can improve the performance of FMCW systems by enabling the extraction of information associated with both polarization states via polarization sensitive photonic components. The performance improvements include denser point-clouds with fewer missing pixels, higher SNRs, and target reflectivity specific information that can provide information associated with a type of the target material.

SUMMARY

This summary is not intended to identify critical or essential features of the disclosures herein, but instead merely summarizes certain features and variations thereof. Other details and features will also be described in the sections that follow.

Some of the features described herein relate to a system and device for mitigating the walk-off effect. In some embodiments, the imaging device (e.g., LIDAR chip) may include a single output waveguide and a plurality of input waveguides. The single output waveguide may be configured to carry an output imaging signal and the plurality of input waveguides may be configured to couple reflected imaging signals into the imaging device. The plurality of input waveguides may be spaced apart based on various parameters such as a FOV, fast-axis speed, slow-axis speed, range of operation, wavelength of operation, chirp bandwidth, chirp frequencies, and/or chirp duration. The spacing between the input waveguides may further be based on optics (e.g., collimators, lenses, etc.) used in the imaging system (e.g., LIDAR system) and/or a waveguide coupling coefficient. In some embodiments, the system may determine a walk-off mitigation parameter based on the various parameters described above and/or configurations of the imaging device.

In some embodiments, the imaging device with the plurality of input waveguides may be configured to continue receiving returning photons associated with a given imaging FOV as the scanning mirror(s) continue to rotate about the fast and slow axis. For example, a first input waveguide of the plurality of input waveguides may receive returning photons from objects closest to the imaging system while a second input waveguide of the plurality of input waveguides may receive returning photons from objects located slightly further away. A third input waveguide of the plurality of input waveguides may then receive returning photons from objects located furthest away from the imaging system for a given maximum range of operation of the system. As such, the imaging system can be configured to minimize loss of returning signals based on maximizing the capture of the returning photons for different orientations of the scanning mirror(s). This can enable the imaging system to scan a target region at higher imaging speeds without degradation of the imaging quality.

In some embodiments, by varying the spacings between each pair of the plurality of input waveguides, a range of operation of the imaging system may be extended. For example, by maximizing returning photon capture for different operating ranges, the imaging system may be able to detect objects located at a short range and a medium range of operation simultaneously. In some instances, a range of operation of the imaging system may be extended while maintaining the same scanning speeds. This can enable the development of high-performance imaging systems without increasing costs.

BRIEF DESCRIPTION OF THE DRAWINGS

Some features herein are illustrated by way of example, and not by way of limitation, in the figures of the accompanying drawings and in which like reference numerals refer to similar elements.

FIGS. 9A-9B show alternative embodiments for polarization separation of the laser input signal in accordance with various embodiments described herein.

DETAILED DESCRIPTION

Figure 1:
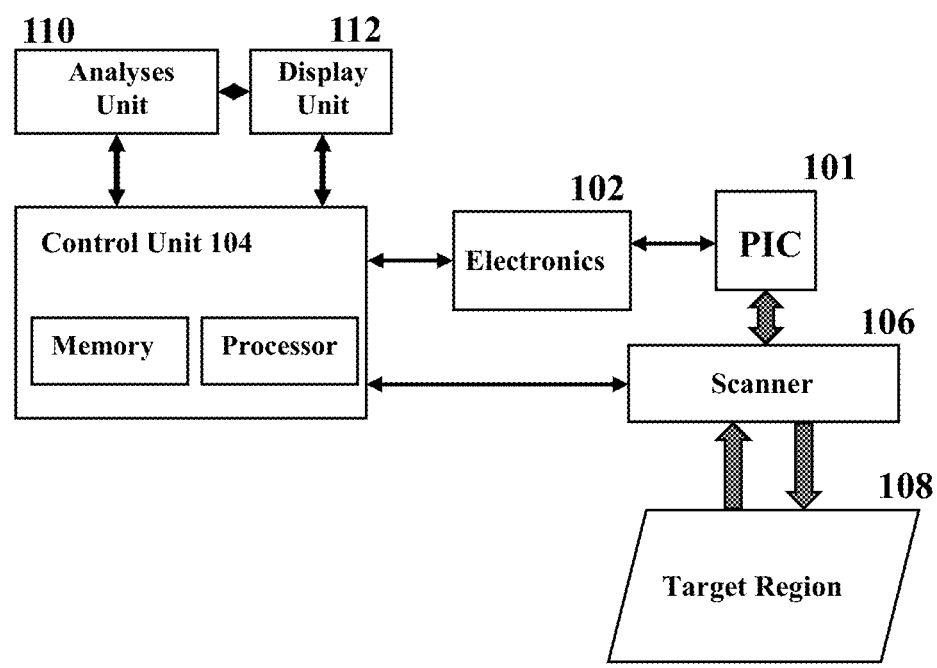
FIG. 1 shows a remote imaging system in accordance with various embodiments described herein.

Example embodiments will now be described more fully with reference to the accompanying drawings. Many alternate forms may be embodied, and example embodiments should not be construed as limited to example embodiments set forth herein. In the drawings, like reference numerals refer to like elements.

It will be understood that, although the terms first, second, etc. may be used herein to describe various elements, these elements should not be limited by these terms. As used herein, the term "and/or" includes any and all combinations of one or more of the associated items. Unless specifically stated otherwise, or as is apparent from the discussion, terms such as "processing" or "computing" or "calculating" or "determining" or "displaying" or the like, refer to the action and processes of a computing system, or similar electronic computing device, that manipulates, and transforms data represented as physical, electronic quantities within the computing system's registers and memories into other data similarly represented as physical quantities within the computing system's memories or registers or other such information storage, transmission or display devices.

In the following description, illustrative embodiments will be described with reference to symbolic representations of operations (e.g., in the form of flow charts, flow diagrams, data flow diagrams, structure diagrams, block diagrams, etc.) that may be implemented as program modules or functional processes including routines, programs, objects, components, data structures, etc. that perform particular tasks or implement particular abstract data types and may be implemented using hardware in electronic systems (e.g., an imaging and display device). Such existing hardware may include one or more digital signal processors (DSPs), application-specific integrated circuits (ASICs), field programmable gate arrays (FPGAs), central processing units (CPUs), or the like.

As disclosed herein, the term "storage medium," "computer readable storage medium" or "non-transitory computer readable storage medium" may represent one or more devices for storing data, including read only memory (ROM), random access memory (RAM), magnetic RAM, magnetic disk storage memory, optical storage mediums, flash memory devices and/or other tangible machine readable mediums for storing information. The term "computer-readable memory" may include, but is not limited to, portable or fixed storage devices, optical storage devices, and various other mediums capable of storing, containing or carrying instructions and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. When implemented in software, a processor(s) may be programmed to perform the necessary tasks, thereby being transformed into special purpose processor(s) or computer(s).

FIG. 1 shows a schematic illustration of a remote imaging system 100. The imaging system may include an imaging device 101 that can comprise a photonic integrated circuit (PIC) for generating, transmitting, and/or receiving light signals. The imaging system can further include a mechanism for steering the light signals 106 (e.g., scanning module, micro-electro-mechanical mirrors, arrayed waveguide gratings, optical phased arrays, etc.), a control unit 104, an analysis unit 110, at least one display unit 112, interface electronics 102, optics (e.g., collimators, lenses, etc.), and various other processing elements (e.g., DSPs, ASICs, CPUs, FPGAs, circuits, memory, etc.). In some embodiments, the imaging system may include one or more communication interfaces such as graphical user interfaces (GUIs).

The PIC 101 may interface with the electronics 102 and the control unit 104 that can include memory, such as the non-transitory computer readable storage medium described above, in communication with various processing elements (e.g., electrical circuits, microprocessors, DSPs, ASICs, FPGAs, CPUs). Although the electronics are illustrated as a single component in a single location, the electronics may include multiple different components that are independent of one another and/or placed in different locations. Additionally, as noted above, all or a portion of the disclosed electronics may be included on the chip including electronics that may be integrated with the chip. The electronics may comprise a part of the LIDAR system.

The imaging system 100 may be configured to scan a target region 108 based on controlling one or more photonic components of the PIC 101 and/or the scanning module 106. For example, the imaging system 100 may generate an output imaging signal that is configured to scan the target region 108 over a FOV of approximately 10 to 180 degrees and at approximate scan speeds of 50 Hz upto several kHz for a fast axis and a few Hz to tens of Hz for a slow axis of the scanner module 106.

In some embodiments, the imaging system may be a FMCW LIDAR system and the PIC may be a LIDAR chip or a portion of a LIDAR chip. The LIDAR system may generate an output light signal such as a LIDAR output signal that is frequency modulated over different chirp durations. For example, the frequency of the LIDAR output signal may linearly increase over a first chirp duration, ($t_1$) and linearly decrease over a second chirp duration ($t_2$). This may vary a wavelength of the LIDAR output signal over the different chirp durations. For example, the wavelength of the LIDAR output signal may vary between approximately 1200 nm to 1320 nm, 1400 nm to 1590 nm, and 1900 to 2100 nm depending upon the wavelength range of operation of the on-chip laser. In some embodiments, one or more light sources (e.g., laser) may be configured to generate the LIDAR output signal with a wavelength centered around approximately 1550 nm. The first chirp duration with the linearly increasing outgoing LIDAR signal frequency may be referred to as an up-ramp chirp and the second chirp duration with the linearly decreasing outgoing LIDAR signal frequency may be referred to as a down-ramp chirp. The LIDAR system may be configured to estimate a target range and/or velocity based on at least one chirp duration.

The control unit 104 may be configured to cause the scanning module 106 to control the scanning of different target regions based on steering the outgoing LIDAR signal. The target regions can each be associated with at least one data cycle and/or each data cycle can be associated with one of the target regions. As a result, each LIDAR data result can be associated with one of the target regions. Different target regions may have some overlap or be distinct from one another. For data cycles that include two chirp durations, each data point for a target region may be associated with two chirp durations. For data cycles that include three chirp durations, each data point for a target region may be associated with three chirp durations.

Figure 2:
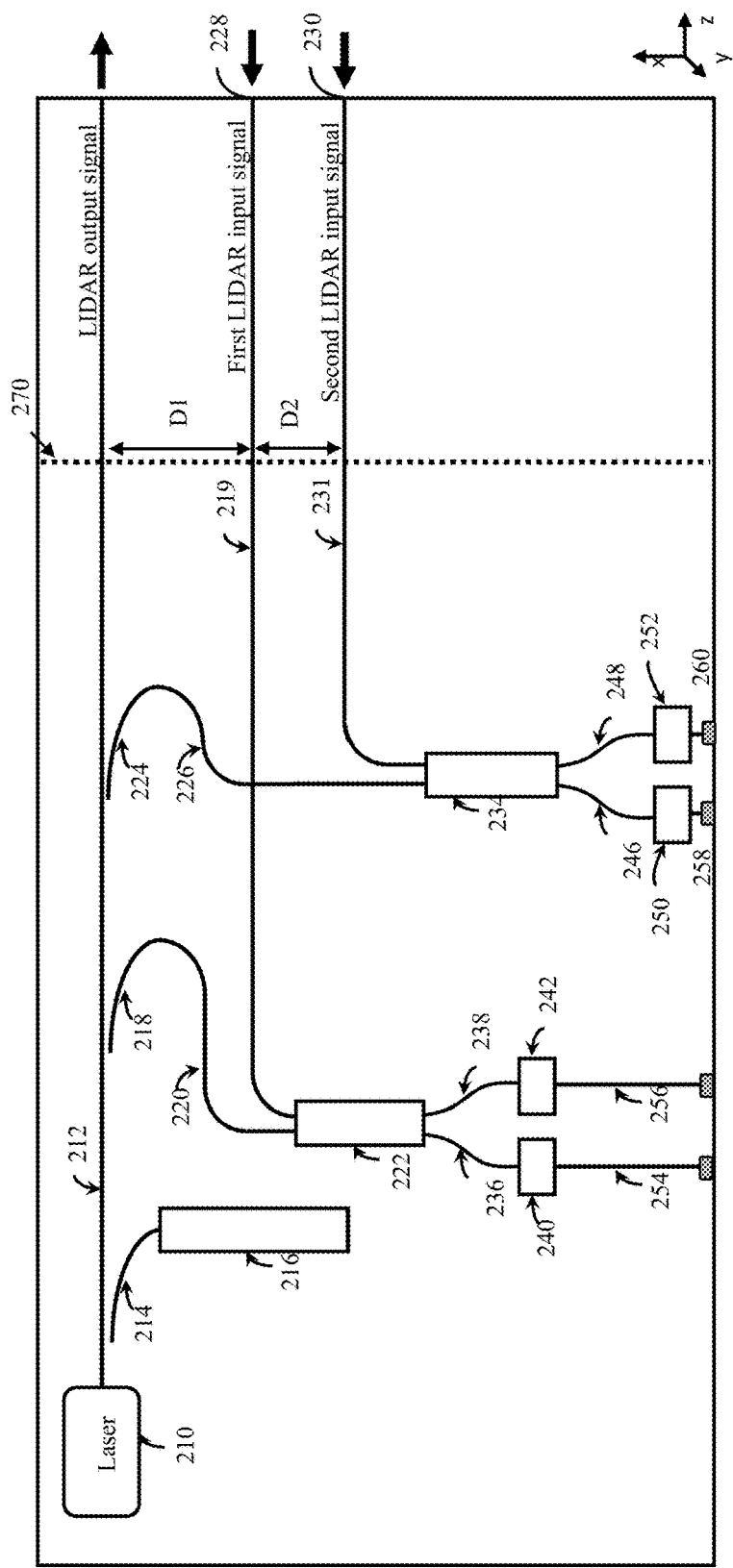
FIG. 2 shows an example illustration of a LIDAR chip in accordance with various embodiments described herein.

FIG. 2 shows a top view of a LIDAR chip incorporating walk-off mitigation by including a multiple input waveguide configuration. Later arriving LIDAR signals that may be offset from a first input facet 228 may still be collected via second input facet 230 that can be positioned away from the first facet, along a horizontal axis of the chip edge. The LIDAR chip may include a light source 10 (e.g., laser) and a plurality of photonic components such as, an output waveguide 16, a first input waveguide 219, a second input waveguide 231, the first input facet 228, the second input facet 230, a first reference waveguide 220, a second reference waveguide 226, a first light-combining component 222, a second light-combining component 234, splitters 214, 218 and 224, and an interferometer 216.

The first input waveguide 219 may be positioned away from the output waveguide 212 by a first predetermined distance (D1) and spaced apart from the second input waveguide a second predetermined distance (D2). In some embodiments, the first predetermined distance and/or the second predetermined distance may vary between 50 nm up to 10 µm. Various parameters may affect a selection of D1 and/or D2 including at least one of the range of operation (e.g., short-range<10 m, mid-range 10 m up to 50 m, and long-range>50 m), the wavelength range of operation (e.g., 1200 nm to 1320 nm, 1400 nm to 1590 nm, and 1900 to 2100 nm), the chirp duration, the chirp rate, the scanning module 106 parameters, specifications of the lens and/or collimators used to focus the optical signals (e.g., the LIDAR output signal, the first LIDAR input signal, and the second LIDAR input signal) to-and-from the LIDAR chip.

The output waveguide 212 may couple light from the laser 210. The coupled laser light may be transmitted to the output facet via the output waveguide that terminates the output facet. The laser light emitted from the output facet may be referred to as the outgoing LIDAR signal or the LIDAR output signal interchangeably. The output facet may be positioned at an edge of the LIDAR chip. The output facet may be referred to as a terminating facet associated with the output waveguide 212. The LIDAR chip of FIG. 2 may be associated with the LIDAR chips described in related applications bearing application Ser. Nos. 16/931,444, 16/547,522 and 16/726,235, disclosed herein in their entirety.

In some embodiments, the LIDAR chip may include an amplifier positioned along the output path of the LIDAR output signal and before the output facet. For example, the output waveguide 212 may carry the LIDAR output signal to the amplifier and an amplified LIDAR output signal may then exit the LIDAR chip from the output facet. Electronics 102 may be configured to control the amplifier operation and/or control a power of the LIDAR output signal. Examples of amplifiers include, but are not limited to, Erbium-doped fiber amplifiers (EDFAs), Erbium-doped waveguide amplifiers (EDWAs), and Semiconductor Optical Amplifiers (SOAs). In some embodiments, the amplifier may be a discrete component that is attached to the chip. The discrete amplifier may be positioned at any location on the LIDAR chip along the path of the LIDAR output signal. In some embodiments, all or a portion of the amplifier may be fabricated as along with the LIDAR chip as an integrated on-chip component. The LIDAR chip may be fabricated from various substrate materials including, but not limited to, silicon dioxide, indium phosphide, and silicon-on-insulator (SOI) wafers. Examples of splitters 214, 218, and 224 include, but are not limited to, y-junctions, optical couplers, and MMIs.

In some embodiments, optics, such as lenses, collimator(s), and mirror(s) may be positioned off-chip. The scanning module 106 may then direct the LIDAR output signal towards a targeted FOV and direct the returning LIDAR signals associated with the LIDAR output signal back to the collimating and/or focusing optics. For example, a lens may collect the returning LIDAR signals and focus the returning signals onto a mirror of the scanner. The mirror may then direct the returning signals towards LIDAR chip. However, due to the perpetual motion of the scanner mirror, the returning signals associated with a particular output signal reflection may be directed back to the LIDAR chip at an area that is offset from the output facet. The output signal and returning signal may not traverse the same path into and out of the LIDAR chip. For example, the output signal may exit the chip from the output facet and the earliest reflected signal may enter the chip via the first input facet 228. A later arriving reflected signal may enter the chip via the second input facet 230. Both the input signals, such as the first input signal and the second input signal, correspond to return signals from two different objects that have been scanned during a given measurement chirp duration of the output signal. The measurement duration may be an up-chirp duration or a down-chirp duration.

As an example, a first LIDAR input signal that enters the input waveguide 219 may be associated with a first object located closer to the LIDAR chip than a second object reflecting a second LIDAR input signal that enters the input waveguide 231 after a short delay. The arrival delay between the first LIDAR input signal and the second LIDAR input signal may be proportional to a line-of-sight distance between the first object and the second object relative to a location of the LIDAR chip. Both input signals may correspond to reflections of the output signal during a particular chirp duration and the same FOV. In some instances, both input signals may correspond to reflections from different surfaces of the same object.

The input waveguides 219 and 231 may transmit the first and the second LIDAR input signals to respective light-combining components 222 and 234 (e.g., multi-mode interference device (MMI), adiabatic splitter, and/or directional coupler) that may be a part of two data branches of the LIDAR chip. In some embodiments, the light-combining components 222 and 234 may be MMI devices such as 2×2 MMI device. The functions of the illustrated light-combining components may be performed by more than one optical component.

Each data branch may include photonic components that guide and/or modify the optical LIDAR signals for the LIDAR chip. The photonic components of each data branch may include a splitter (e.g., 218 and 224), a reference waveguide (e.g., 220 and 226), the light-combining component (e.g., 222 and 234), a first detector waveguide (e.g., 236 and 246), a second detector waveguide (e.g., 238 and 248), a first light sensor (e.g., 240 and 250), and a second light sensor (e.g., 242 and 252). Elements 254, 256, 258 and 260 may be respectively associated with electrical signal lines that terminate in bond pads for interfacing with external electronics.

Each splitter may transmit a portion of the laser output from the output waveguide 212 into the corresponding reference waveguide. For example, the splitter 218 may be positioned sufficiently close to the output waveguide 212 to enabling coupling of light from the output waveguide 212 into the reference waveguide 220.

The portion of the laser signal transmitted to the reference waveguides may be referred to as a reference signal. For example, the first reference waveguide 220 carries the first reference signal to the first light-combining component 222 and the second reference waveguide 226 may carry the second reference signal to the second light-combining component 234.

In some embodiments, if the first light-combining component 222 is a 2×2 MMI, the first LIDAR input signal and the first reference signal may couple into the two inputs of the 2×2 MMI via the first input waveguide 219 and the first reference waveguide 220 respectively. Similarly, the second LIDAR input signal and the second reference signal may couple into two inputs of the 2×2 MMI of the second light-combining component 234. Each of the two input light signals may then interfere as they travel along the two arms of the respective MMI resulting in each output of the MMIs carrying a combined portion of the respective input signals. For example, the output of the first MMI 222 may include a portion of both the first LIDAR input signal and the reference signal on the two output arms. The output light signal associated with the first arm of the MMI 222 may include a portion of the first LIDAR input signal and a portion of the reference signal and the output light signal associated with the second arm of the MMI may include a remaining portion of the first LIDAR input signal and a remaining portion of the reference signal.

In some embodiments, there may be a phase shift (e.g., 0 to π) between output light signals of the first arm and the second arm of each of the MMIs. The output light signals associated with the two arms of the first MMI may be referred to as a first composite signal and a second composite signal, wherein the first and the second composite signals including portions of the first LIDAR input signal and portions of the reference signal. The output light signals associated with the two arms of the second MMI may be referred to as a third composite signal and a fourth composite signal, wherein the third and the fourth composite signals including portions of the second LIDAR input signal and portions of the second reference signal.

The first composite signal may couple into a first detector waveguide 236, the second composite signal may couple into a second detector waveguide 238, the third composite signal may couple into a third detector waveguide 246 and the fourth composite signal may couple into a fourth detector waveguide 248. The first detector waveguide 36 may then transmit the first composite signal to the first light sensor 240, the second detector waveguide 38 may transmit the second composite signal to the second light sensor 242, the third detector waveguide 246 may transmit the third composite signal to the third light sensor 250 and the fourth detector waveguide 248 may transmit the fourth composite signal to the fourth light sensor 252.

Each light sensor may then convert the corresponding composite optical signal into a respective electrical signal. For example, the first light sensor 240 may then convert the first composite signal into a first electrical signal. As another example, the second light sensor 242 may convert the second composite signal into a second electrical signal. As such, the first light sensor 240 and the second light sensor 242 respectively convert the first composite signal and the second composite signal into photodetector currents that vary in time. Examples of the light sensors include photodiodes (PDs), and avalanche photodiodes (APDs).

In some embodiments, the light sensor pairs 240 and 242, and 250 and 252 may be configured as balanced photodetectors in a series arrangement to cancel out direct current (DC) components associated with their respective photocurrents. The balanced photodetector configuration can reduce noise and/or improve detection sensitivities associated with the photodetectors.

The LIDAR chip can include a control branch 216 for controlling operation of the laser 10. The control branch may include a directional coupler that can couple a portion of the laser output from the output waveguide 212 into a control waveguide. The coupled portion of the laser output transmitted via the control waveguide can serve as a tapped signal. In some embodiments, other signal-tapping photonic components, such as y-junctions and/or MMIs, may be used in place of the directional coupler.

The control waveguide can carry the tapped laser signal to a control interferometer that splits the tapped signal and then re-combines different portions of the tapped signal that are respectively offset in phase with respect to each other. The control interferometer may be a Mach-Zhender interferometer (MZI) comprising two unequal arms along which the split-up portions of the input signal travel before re-combining (e.g., interfering) towards the end; however, other interferometer configurations may be used. The control interferometer signal output may be characterized by an intensity that is largely a function of the frequency of the tapped laser output. For example, the MZI may output a sinusoidal signal characterized by a fringe pattern.

The sinusoidal signal from the control interferometer can couple into an interferometer waveguide and can function as an input to a control light sensor. The control light sensor may convert the sinusoidal light signal into an electrical signal that can serve as an electrical control signal. Changes to the frequency of the outgoing LIDAR signal will cause changes to the frequency of the control light signal. Accordingly, the frequency of the electrical control signal output from the control light sensor is a function of the frequency of the LIDAR output signal. Other detection mechanisms can be used in place of the control light sensor.

Electronics 62 can operate one or more components on the chip. For instance, the electronics 62 can be in electrical communication with and control operation of the laser 10, the light sensors, and the control light sensor. Although the electronics 62 are shown off the chip, all or a portion of the electronics can be included on the chip. For instance, the chip can include electrical conductors that connect the first light sensor 240 in series with the second light sensor 242.

In some embodiments, the electronics may control the chirp frequency and/or the chirp duration of the LIDAR output signal as described earlier with respect to FIG. 1. A measurement duration may correspond to one or more chirp durations. Each measurement duration may be referred to as a data cycle. LIDAR data can be generated for each (radial distance and/or radial velocity between the LIDAR system and a reflecting object) data cycle.

For example, one data cycle may correspond to two chirp durations effectively encompassing an up-ramp chirp duration and a down-ramp chirp duration. As another example, one data cycle may correspond to three chirp durations effectively encompassing an up-ramp, a down-ramp and another up-ramp chirp duration.

During each data period, the electronics 62 may tune the chirp frequency of the LIDAR output signal. As will be described in more detail below, the electronics 62 can employ output from the control branch in order to control the chirp frequency of the outgoing LIDAR signal such that the chirp frequency of the LIDAR output signal as a function of time is known to the electronics. During the first chirp duration, the electronics 62 may increase the frequency of the LIDAR output signal and during the second chirp duration the electronics 62 may decrease the frequency of the LIDAR output signal or vice versa.

When the LIDAR output signal frequency is increased during the first chirp duration, the signal travels away from the LIDAR chip and an object positioned in a sample region of a field of view may reflect light from the LIDAR output signal. At least a portion of the reflected light is then returned to the chip via the first LIDAR input signal as described earlier. During the time that the LIDAR output signal and the first LIDAR input signal are traveling between the chip and the reflecting object, the frequency of the LIDAR output signal exiting the output facet may continue to increase. Since a portion of the output signal is tapped as the reference signal, the frequency of the reference signal continues to increase. As a result, the first LIDAR input signal enters the light-combining component 222 with a lower frequency than the reference signal concurrently entering the light-combining component. Additionally, the further the reflecting object is located from the chip, the more the frequency of the reference signal increases before a LIDAR input signal returns to the chip because the further the reflecting object is located, the greater will be the round-trip delay associated with the LIDAR imaging signal. Accordingly, the larger the difference between the frequency of the first LIDAR input signal and the frequency of the reference signal, the further the reflecting object is from the chip. As a result, the difference between the frequency of the first LIDAR input signal and the frequency of the reference signal is a function of the distance between the chip and the reflecting object.

The composite signal may be based on interference between the respective LIDAR input signal and the reference signal within the corresponding light-combining component. For instance, since the 2×2 MMI guides the first LIDAR input signal and the first reference signal over two paths in close proximity to each other, and these signals have different frequencies, there is beating between the first LIDAR input signal and the first reference signal. Accordingly, the composite signal can be associated with a beat frequency related to the frequency difference between the first LIDAR input signal and the first reference signal and the beat frequency can be used to determine the difference in the frequency between the first LIDAR input signal and the first reference signal. A higher beat frequency for the composite signal indicates a higher differential between the frequencies of the first LIDAR input signal and the first reference signal. As a result, the beat frequency of the data signal is a function of the distance and/or radial velocity between the LIDAR system and the reflecting object.

The beat frequencies ($f_{LDP}$) from two or more data periods or chirp durations may be combined to generate LIDAR data that may include frequency domain information, distance and/or radial velocity information associated with the reflecting object. For example, a first beat frequency that the electronics 62 determine from a first data period ($DP_1$) can be combined with a second beat frequency that the electronics determine from a second data period ($DP_2$) to determine a distance of the reflecting object from the LIDAR system and in some embodiments, a relative velocity between the reflecting object and the LIDAR system.

The following equation can apply during the first data period during which the electronics 62 may linearly increase the frequency of the outgoing LIDAR signal: $f_{ub}=-f_d+\alpha\tau$, where $f_{ub}$ is the beat frequency, and $f_d$ represents the Doppler shift ($f_d=2vf_c/c$), where $f_c$ represents the optical frequency ($f_o$), c represents the speed of light, v is the radial velocity between the reflecting object and the LIDAR system where the direction from the reflecting object toward the chip is assumed to be the positive direction. The following equation can apply during the second data period where electronics linearly decrease the frequency of the outgoing LIDAR signal: $f_{db}=-f_d-\alpha\tau$, where $f_{db}$ is the beat frequency. In these two equations, $f_d$ and $\tau$ are unknowns. The electronics 62 can solve these two equations for the two unknowns. The radial velocity for the reflecting object with the sampled region can then be determined from the Doppler shift ($v=c*f_d/(2f_c)$) and the separation distance between the reflecting object in that sampled region and the LIDAR chip can be determined from $c*f_d/2$.

In instances where the radial velocity between the LIDAR chip and the reflecting object is zero or very small, the contribution of the Doppler effect to the beat frequency is essentially zero. In these instances, the Doppler effect may not make a substantial contribution to the beat frequency and the electronics 62 may use the first data period to determine the distance between the chip and the reflecting object.

During operation, the electronics 62 can adjust the frequency of the outgoing LIDAR signal in response to the electrical control signal output from the control light sensor. As noted above, the magnitude of the electrical control signal output from the control light sensor is a function of the frequency of the outgoing LIDAR signal. Accordingly, the electronics 62 can adjust the frequency of the outgoing LIDAR signal in response to the magnitude of the control. For instance, while changing the frequency of the outgoing LIDAR signal during a data period, the electronics 62 can have a range of preset values for the electrical control signal magnitude as a function of time. At multiple different times during a data period, the electronics 62 can compare the electrical control signal magnitude to the range of preset values associated with the current time in the sample. If the electrical control signal magnitude indicates that the frequency of the outgoing LIDAR signal is outside the associated range of electrical control signal magnitudes, the electronics 62 can operate the laser 10 so as to change the frequency of the outgoing LIDAR signal so it falls within the associated range. If the electrical control signal magnitude indicates that the frequency of the outgoing LIDAR signal is within the associated range of electrical control signal magnitudes, the electronics 62 do not change the frequency of the outgoing LIDAR signal.

By implementing the multiple input waveguide configuration associated with a single outgoing LIDAR signal, the imaging system may achieve high scan rates (e.g., upto 10 kHz) without suffering from losses in the return signal. Moreover, the system may maintain a high scan resolution at the high scan rates over an extended range of operation due to increased efficiency of photon collection associated with photons returning at a later time from further away. For example, the system may maintain the high scan resolution at scan rates of approximately 100 Hz for a maximum range of operation of 300 m and a minimum range of operation of at least 20 m with walk-off mitigation instead of being limited to a maximum range of operation of approximately 80 m without any walk-off mitigation. The FOV associated with the system may vary between approximately 10 degrees to 180 degrees.

Figure 3:
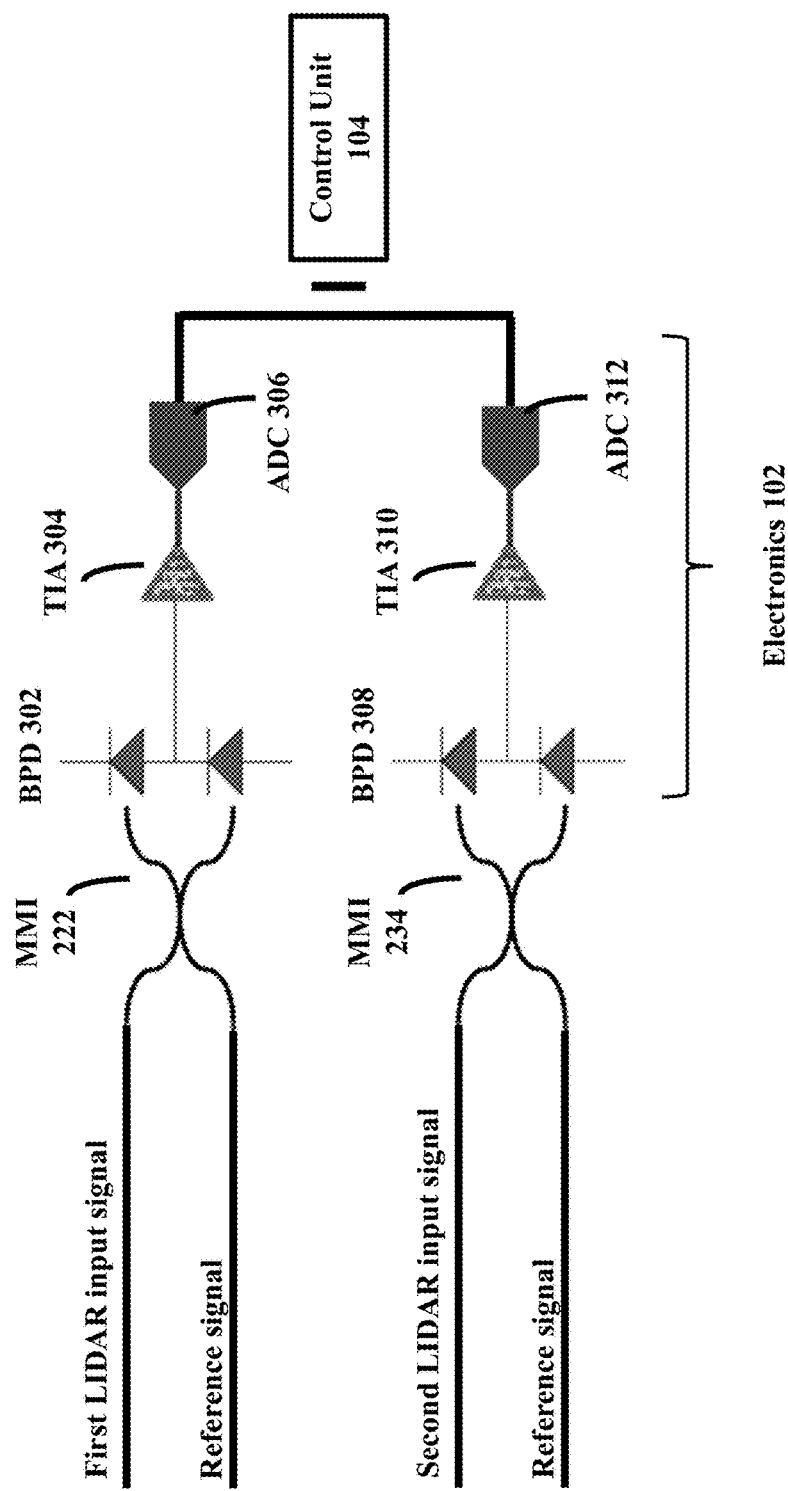
FIG. 3 shows an example illustration of electronics, control and processing circuitry interfacing with photonic components of the LIDAR chip of FIG. 2 in accordance with various embodiments described herein.

FIG. 3 illustrates a portion of the LIDAR chip of FIG. 2 in communication with additional electronic, control, and/or processing circuitry. For example, the light combining component 222 (e.g., 2×2 MMI) of FIG. 2 may interface with a transducer element, such as the balanced photodetector (BPD) 302, and/or a transimpedance amplifier (TIA) 304 that is electrically connected to an analog-to-digital converter (ADC) 306 and the control unit 104. As another example, the light combining component 234 may interface with a BPD 308, and/or TIA 310 that is electrically connected to an ADC 312. The output of the ADC 312 may be transmitted to the control unit 104.

The TIAs 304 and 310 may be configured to convert the time varying photocurrent output of the corresponding BPD arrangement into a time varying voltage signal or beat signal that has the beat frequency as described above with reference to FIG. 2. According to some embodiments, the beat signal may be largely sinusoidal and may be a function of at least the relative velocity between the LIDAR chip and the reflecting object. For example, if the LIDAR chip and the reflecting object are moving towards each other, the beat signal may increase in frequency and vice-versa. The beat signal can then serve as an input to the corresponding ADCs that sample the respective beat signal based on a predetermined sampling frequency to generate a sampled or quantized beat signal output. The predetermined sampling frequency may be based on a maximum range of operation of the LIDAR system. In some instances, the predetermined sampling frequency may be based on the maximum range of operation of the LIDAR system and a maximum relative velocity between the scanned target and the LIDAR chip. In some embodiments, the sampling frequency may vary between 100 MHz and 400 MHz. The sampled beat signal output of the ADCs may be electrically connected to the control unit 104 for estimating the beat frequency.

The BPDs may comprise the light sensors 240 and 242, and the light sensors 250 and 252 arranged in series as shown in FIG. 2. The TIAs 304 and 310 may be included on the LIDAR chip or separate from the LIDAR chip. The ADCs 306 and 312 may be a discrete component or part of additional processing elements that may comprise a part of the control unit 104. In alternative embodiments, the 2×2MMI 222 may be replaced by a 2×1MMI as described above with respect to FIG. 2. The control unit 104 may include one or more DSPs, ASICs, FPGAs, CPUs, or the like. In some instances, the up-chirp and the down-chirp durations may be different and the corresponding measurement periods may be different.

Figure 4:
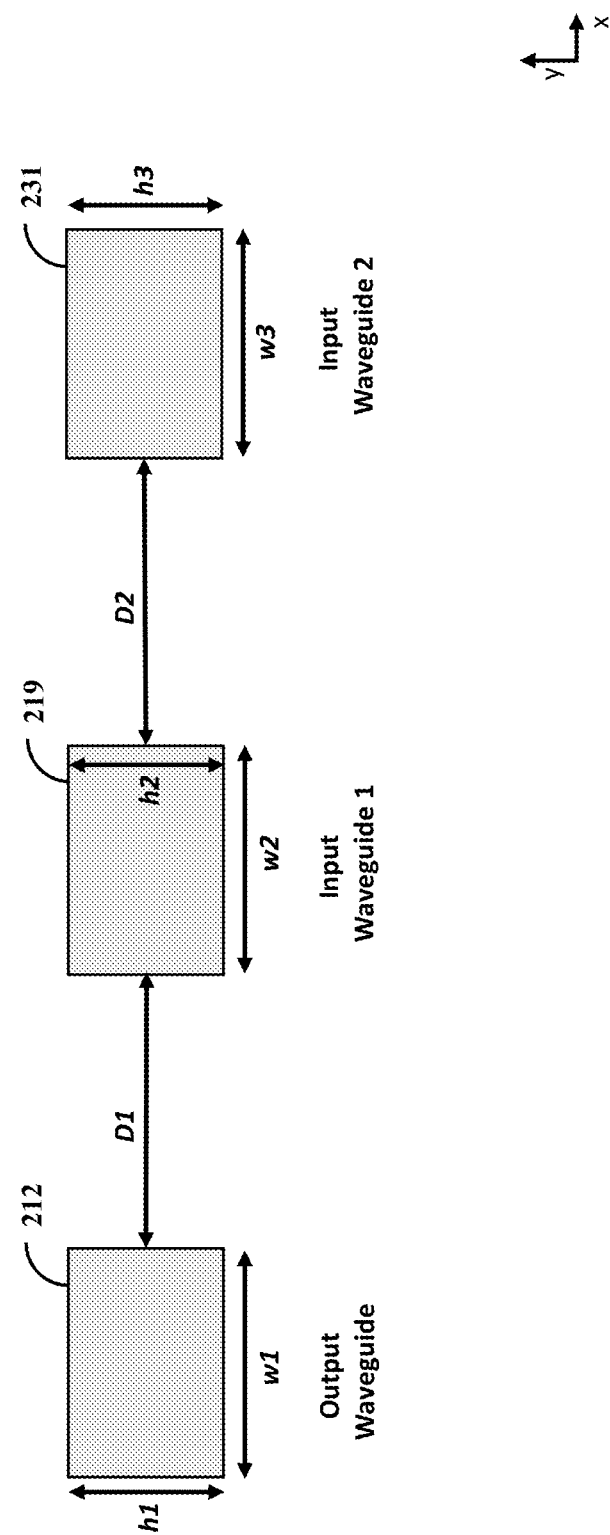
FIG. 4 shows a cross-sectional view of a plurality of input waveguides associated with the LIDAR chip of FIG. 3 in accordance with various embodiments described herein.

FIG. 4 shows a cross-sectional view of the output waveguide 212, the first input waveguide 219 and the second input waveguide 231 spaced apart with varying gaps as described earlier with respect to FIGS. 2 and 3. The cross-sectional view of FIG. 4 may be associated with cross-sections of FIG. 2 as shown along the dotted line 270. Each waveguide may be characterized by a respective height (e.g., h1, h2, and h3) and a respective width (e.g., w1, w2, and w3), wherein the respective height may vary between 200 nm and 5 µm and the respective width may vary between 200 nm and 5 µm. In some embodiments, the first input waveguide 219 may be positioned at the predetermined distance D1 away from the output waveguide 212. The second input waveguide 231 may be positioned at the predetermined distance D2 away from the input waveguide 219 and a total distance of (D1+D2+w2) away from the output waveguide 212. In some embodiments, D1 may approximately equal D2. The spacing between the output waveguide 212 and a closest input waveguide may vary between approximately 50 nm and 10 µm. The spacing between the input waveguides (e.g., the first input waveguide and the second input waveguide) may vary between approximately 50 nm and 10 µm.

Figure 5:
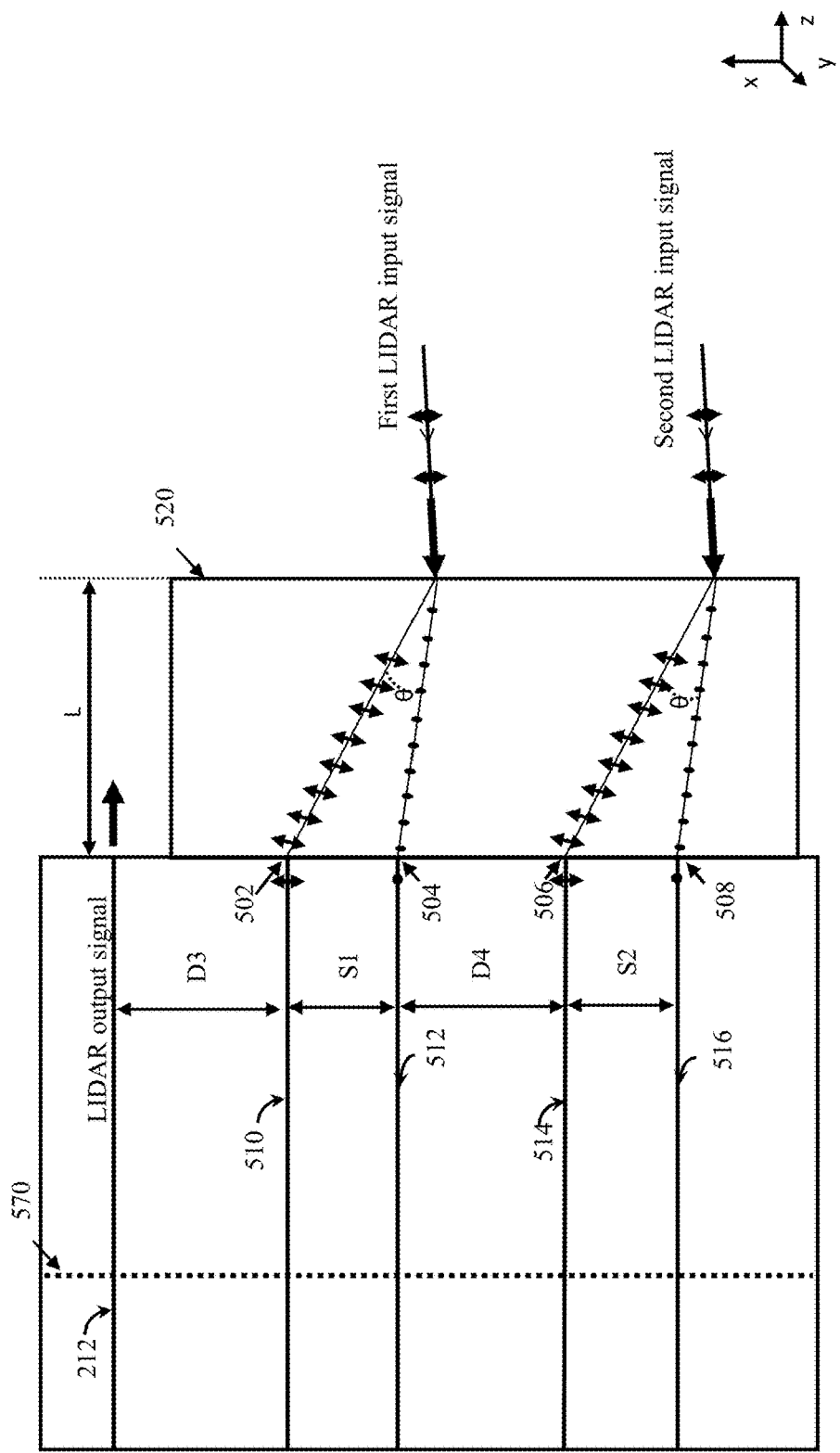
FIG. 5 shows an illustration of a polarization separator positioned adjacent to an edge of a LIDAR chip in accordance with various embodiments described herein.

FIG. 5 shows polarization separation of incoming LIDAR signals for a LIDAR system. A birefringent crystal that splits a randomly polarized optical signal into a transverse electric (TE) component and a transverse magnetic (TM) component may be used for polarization separation purposes. The birefringent crystal may be positioned between the scanning module and the LIDAR chip along the propagation path of the returning LIDAR signals. In some embodiments, the birefringent crystal may be positioned adjacent to the light emitting and collecting edge of the LIDAR chip as shown in FIG. 5.

The birefringent crystal may then split the incoming LIDAR signal into two constituent signals namely a TE-only component and a TM-only component. The two constituent signals may then exit the crystal at two different angles and/or exit points. For the LIDAR chip configuration of FIGS. 2 and 3 that incorporate walk-off mitigation, the birefringent crystal may provide polarization separation for both the first LIDAR input signal and the second LIDAR input signal. For example, the second LIDAR input signal may arrive after the first LIDAR input signal due to reflection off an object located further away from the LIDAR chip. Due to continuous mechanical rotation of the one or more mirrors of the scanning module, the second LIDAR input signal may be incident on the birefringent crystal at a different position and/or angle from that of the first LIDAR input signal. The birefringent crystal may then split the first and the second LIDAR input signals into their constituent polarization components and emit the polarization components at different angles and/or from different exits points. For example, the birefringent crystal may split the first LIDAR input signal into a TE-polarized signal and a TM-polarized signal. Each of these signals may then exit the birefringent crystal from two different positions and/or with corresponding refracting angles.

The separation between the TE-polarized and the TM-polarized signals for the first LIDAR signal, upon exiting the crystal, may be S1. The separation S1 may depend upon the dimensions and/or birefringent properties of the crystal and in some instances vary between a few microns up to 200 µm. For example, the greater the length, L, of the crystal, the greater may be the separation S1. In some embodiments, the length of the crystal may be less than approximately 2 mm. The length of the crystal may be determined based on a desired value of S1 and vary between tens of microns and 2 mm.

Since the second LIDAR input signal arrives after the first LIDAR input signal, the scanner rotation may cause the second LIDAR input signal to be incident on the birefringent crystal at a different angle and/or position depending upon the optics and a direction of rotation of the scanner mirror. The second LIDAR input may then further split into a corresponding TE-polarized component and a TM-polarized component that exit the birefringent crystal from unique positions and/or angles. The separation between the TE-polarized and the TM-polarized signals for the second LIDAR signal, upon exiting the crystal, may be S2. The separation S2 may be less than 200 µm and be dependent upon the dimensions and/or birefringent properties of the crystal.

Each of the polarization components of the input signals may couple into the LIDAR chip from respective facets (e.g., 502, 504, 506 and 508) at the edge of the LIDAR chip. Each facet may then connect to a respective input waveguide, such as input waveguides 510, 512, 514 and 516. For example, a LIDAR chip with four input waveguides, wherein two input waveguides are associated with the first LIDAR input signal and the remaining two input waveguides are associated with the second LIDAR input signal can be configured to receive four optical signals that are each associated with a specific polarization state (e.g., TE and TM) of the first LIDAR input signal and the second LIDAR input signal.

LIDAR systems that include birefringent crystals may not need an on-chip polarization separator. Instead, the LIDAR chip may include a polarization rotator, on-chip, along the path of a polarized component of the input signal as described later with respect to FIG. 7.

While FIG. 5 shows a LIDAR chip with four input waveguides corresponding to two LIDAR input signals, the LIDAR chip can be configured to receive multiple LIDAR input signals via multiple input waveguides that are spaced apart depending upon the walk-off mitigation factor and/or an angle of deviation, θ, associated with each polarization component of each of the input signals upon passing through the birefringent crystal.

Processing of the input signals transmitted via each of the four input waveguides may be similar to that described earlier with respect to FIGS. 1, 2 and 3. However, due to the two polarized states of the LIDAR input signals, the LIDAR chip may include polarization separation of the laser input signal in order to generate a corresponding reference signal of a same polarization state as that of the input LIDAR signal. Further details of the polarization separation of the laser signal are provided with respect to FIGS. 8, 9A and 9B. This can enable the LIDAR chip to generate beat signals that respectively correspond to the TE and TM polarized components of each of the LIDAR input signals.

The LIDAR chip may include various photonic components as described earlier beyond the dotted line 570. For example, multiple light combining components, reference waveguides, splitters, light sensors, detector waveguides and BPDs (not shown) may enable processing of each of the optical signals. Each of the light sensors may function as optical to electrical transducers and generate a corresponding electrical signal output that can couple to a corresponding TIA as described earlier with respect to FIGS. 1, 2 and 3. The electrical signal outputs may be carried via corresponding electrical signal lines to respective TIAs. In some embodiments, the TIAs and/or additional ADCs that connect to each of the TIAs may be located on the LIDAR chip whereas in alternative embodiments, the TIAs and/or the additional ADCs may be located on a separate mounting assembly and the electrical signal lines may terminate near an edge of the LIDAR chip at a plurality of wire bond pads.

The above configurations result in the LIDAR data for a single sample region in the FOV being generated from multiple different electrical signals associated with the same sample region. In some instances, determining the LIDAR data for the sample region includes the electronics combining the LIDAR data from different electrical signals. Combining the LIDAR data can include taking an average, median, or mode of corresponding LIDAR data generated from each of the different electrical signals generated by the light sensors, TIAs and/or ADCs.

In some embodiments, the LIDAR data for a sample region may be determined based on the electronics selecting and/or processing one electrical signal out of a plurality of electrical signals that may be representative of the LIDAR data associated with the scanned sample region. The electronics can then use the LIDAR data from the selected electrical signal as the representative LIDAR data to be used for additional processing. The selected electrical signal may be chosen based on satisfying a predetermined SNR, a predetermined amplitude threshold, or a dynamically determined threshold level. For example, the electronics may select the representative electrical signal based on the representative electrical signal having a larger amplitude than other electrical signals associated with the same sample region.

In some embodiments, the electronics may combine LIDAR data associated with multiple electrical signals for the same sample region. For example, the processing system may perform a FT on each of the composite signals and add the resulting FT spectra to generate combined frequency domain data for the corresponding sample region. In another example, the system may analyze each of the composite signals for determining respective SNRs and discard the composite signals associated with SNRs that fall below a certain predetermined SNR. The system may then perform a FT on the remaining composite signals and combine the corresponding frequency domain data after the FT. In some embodiments, if the SNR for each of the composite signals for a certain sample region falls below the predetermined SNR value, the system may discard the associated composite signals.

In some instances, the system may combine the FT spectra associated with different polarization states (e.g., TE and TM), and as a result, different electrical signals, of a same LIDAR input signal. This may be referred to as a polarization combining approach. In some other instances, the system may compare the FT spectra associated with the different polarization states of the same return LIDAR signal and may select the FT spectra with the highest SNR. This may be referred to as a polarization diversity-based approach.

Figure 6:
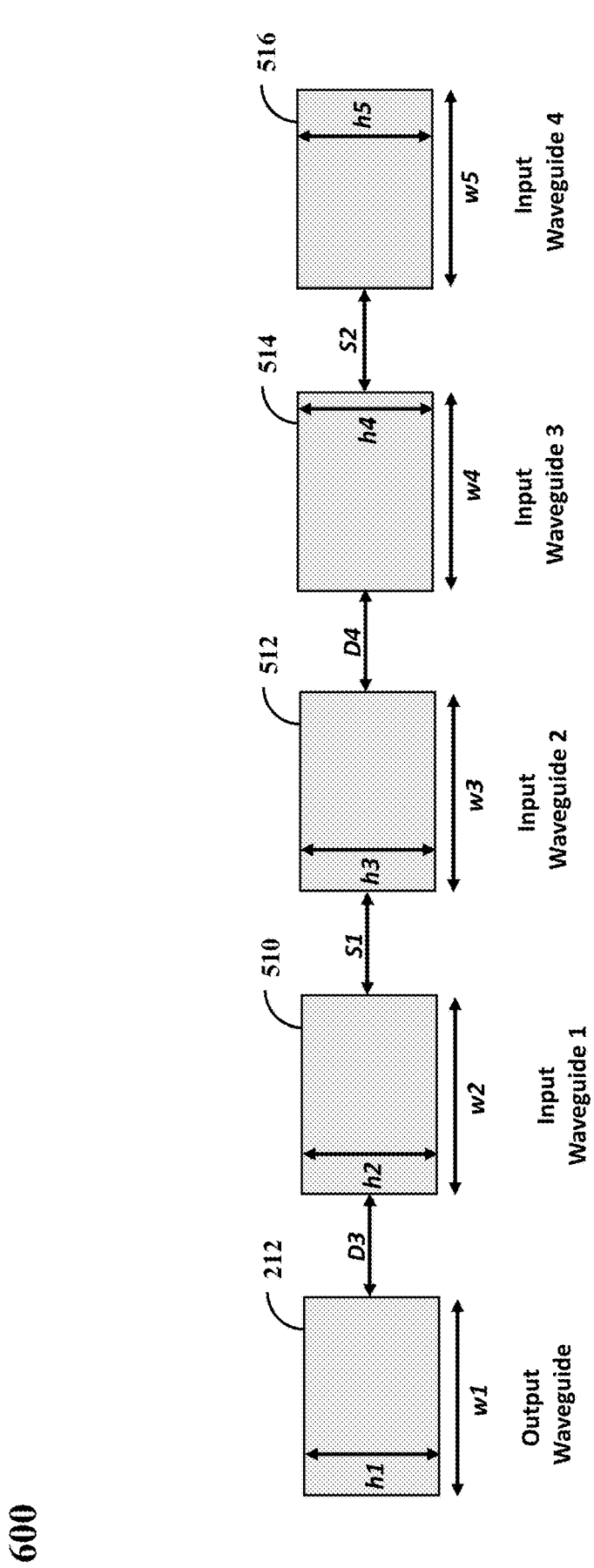
FIG. 6 shows a cross-sectional view of a plurality of input waveguides for the LIDAR chip of FIG. 5 in accordance with various embodiments described herein.

FIG. 6 shows a schematic illustration of a cross-sectional view of the multiple input waveguides (e.g., 510, 512, 514 and 516) and the output waveguide 212. The cross-sectional view of FIG. 6 may be associated with a cross-section shown along the dotted line 570 of FIG. 5. Each waveguide may be characterized by a respective height (e.g., h1, h2, h3, h4, and h5) and a respective width (e.g., w1, w2, w3, w4, and w5), wherein the respective height may vary between 200 nm and 5 µm and the respective width may vary between 200 nm and 5 µm. The output waveguide 212, the first input waveguide 510, the second input waveguide 512, the third input waveguide 514, and the fourth input waveguide 516 may be spaced apart with varying gaps. For example, the first input waveguide 510 may be positioned at a distance D3 away from the output waveguide 212. The second input waveguide 512 may be positioned at a distance S1 away from the input waveguide 510 and a total distance of (S1+D3+w2) away from the output waveguide 212. The third input waveguide 514 may be positioned at distance (S1+D3+w2+D4) away from the output waveguide 212 and the fourth input waveguide 516 may be positioned at distance S2 away from the input waveguide 3 and a total distance of (S1+D3+w2+D4+w4) away from the output waveguide 212.

In some embodiments, D3 may approximately equal D4 and S1 may approximately equal S2. As described earlier with respect to FIGS. 4 and 5, the spacing between the output waveguide 212 and a closest input waveguide may vary between approximately 50 nm and 10 µm. The spacing between the first and the third input waveguides may vary between approximately 600 nm and 250 µm.

As described earlier with respect to FIG. 4, determination of each of the predetermined distances (D1, D2, D3, and D4) may be based on the walk-off mitigation parameter. As described earlier, the walk-off mitigation parameter may be based on various parameters such as the FOV, the fast-axis speed, the slow-axis speed, the range of operation, the wavelength of operation, the chirp bandwidth, the chirp frequencies, and/or the chirp duration. The walk-off mitigation parameter may further be based on the optics (e.g., collimators, lenses, etc.) used in the imaging system (e.g., LIDAR system) and/or the waveguide coupling coefficient.

Although the embodiments of FIGS. 2, 3, 4, 5 and 6 show a two-input and a four-input waveguide configuration, the LIDAR system may comprise of any number of input waveguides for achieving polarization separation and improving an efficiency of collecting later arriving photons reflected from objects located further away and/or offset away from a first input facet located closest to the output waveguide facet due to fast rotation of the one or more mirrors of the scanning module 106.

Figure 7:
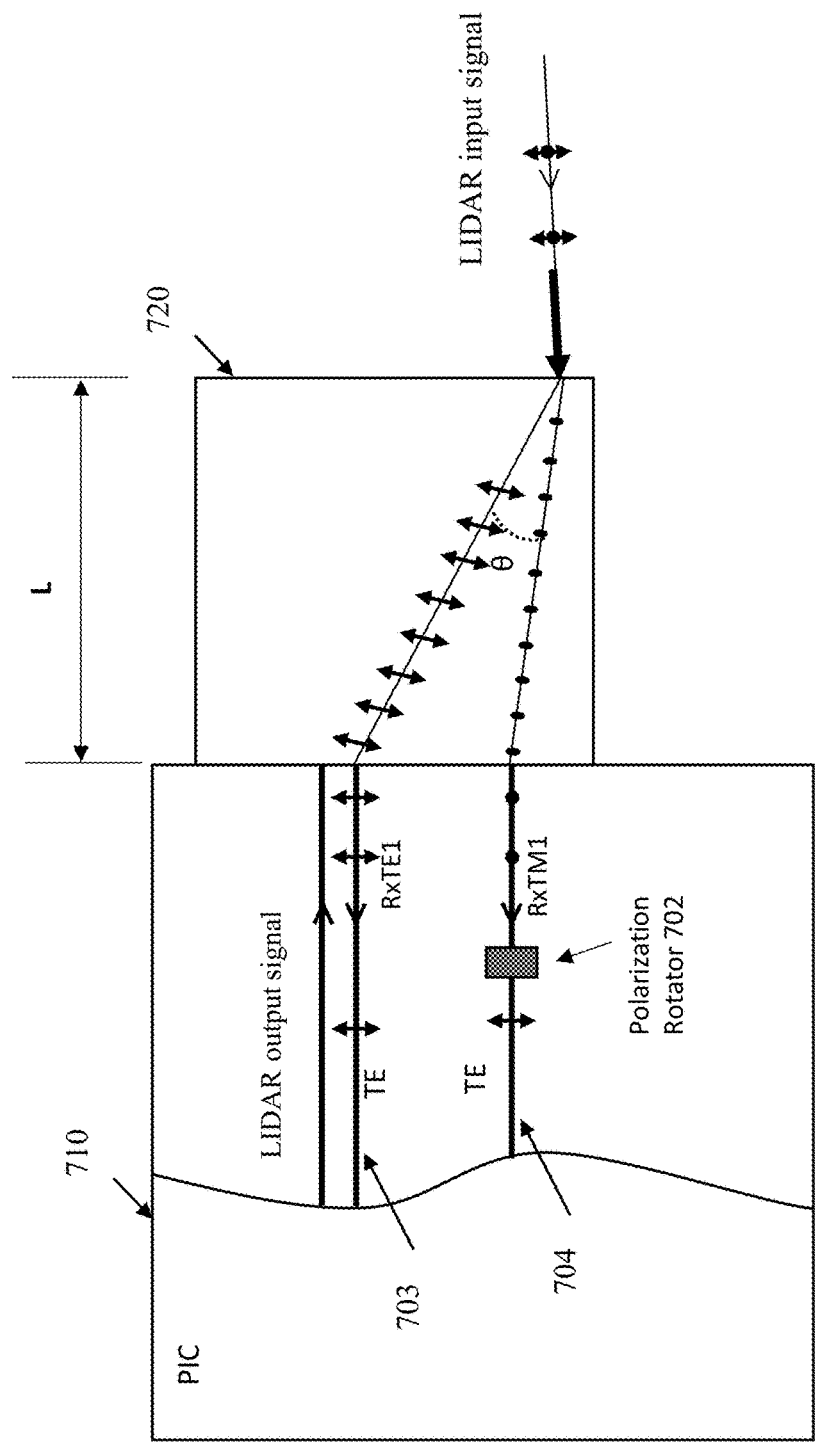
FIG. 7 shows a LIDAR chip with an off-chip birefringent crystal and an on-chip polarization rotator in accordance with various embodiments described herein.

FIG. 7 shows a LIDAR chip 710 with an off-chip birefringent crystal 720 and an on-chip polarization rotator (PR) 702 along a propagation path of a LIDAR input signal. For example, the PR 702 may be introduced along the propagation path of the TM-polarized component of the first LIDAR input signal associated with FIGS. 5 and 6. The PR 702 may be configured to convert the TM-polarized signal into a TE-polarized signal. For example, if the TM-polarized component of the first LIDAR input signal is coupled into the LIDAR chip via the second facet 504 and the second input waveguide 512, the PR 702 may be included along the path of the second input waveguide 512. In some instances, an on-chip polarizer (not shown) may be included along with the PR. For example, the output of the PR 702 may couple into the polarizer to filter-out any remaining TM-polarized portion of the signal coupled out from the PR 702.

Each TE-polarized component may propagate along waveguides 703 and 704. The PIC of FIG. 7 shown beyond the dotted line 710 may include various photonic and/or electric components similar to those described earlier with respect to FIGS. 1-6. For example, the PIC may include light combining components, waveguides, detectors, and BPDs for generating electrical data signals containing information related to the distance and/or velocity of imaged target(s).

Examples of polarization rotators include, but are not limited to, mechanically rotated polarization-maintaining fibers, Faraday rotators, half-wave plates, MEMs-based polarization rotators, and integrated optical polarization rotators using asymmetric y-branches, Mach-Zehnder interferometers and multi-mode interference couplers.

Figure 8:
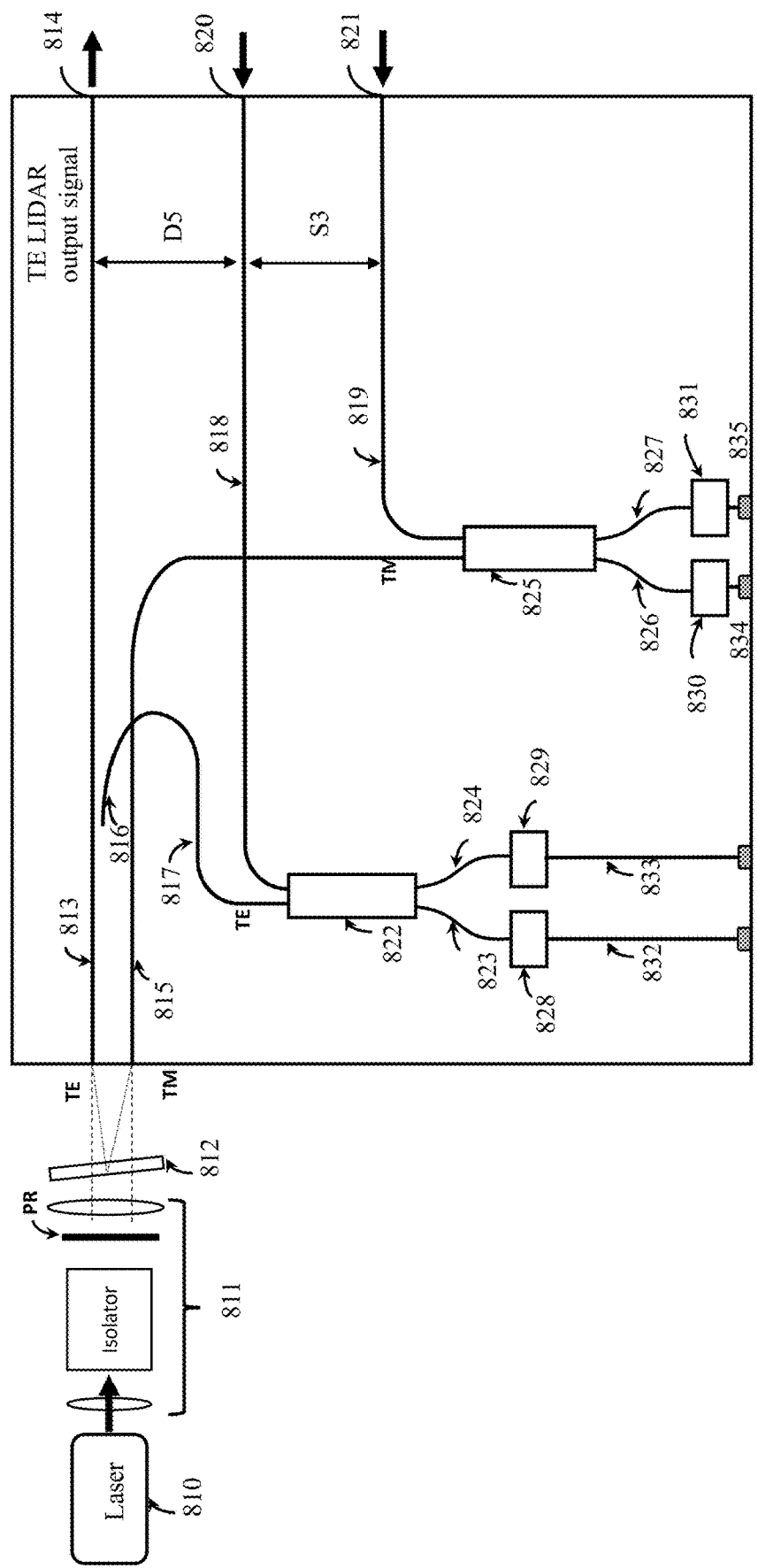
FIG. 8 shows polarization separation of a laser signal before coupling into a LIDAR chip in accordance with various embodiments described herein.

FIG. 8 shows polarization separation of the laser signal before coupling into the LIDAR chip. The system can include a laser 810, focusing and/or collimating optics 811 that may include a polarization rotator (PR), and a birefringent crystal 812. For example, the laser 810 may generate TE-polarized light that emerges with a TE-polarized component and a TM-polarized component after passing through the optics 811. This is because the PR adds a TM-polarized component to the TE-polarized light of the laser. The birefringent crystal 812 may separate the light from the PR into TE and TM-polarized light that can be incident onto two different facets of the LIDAR chip. Each of the facets may allow the laser signal to couple into waveguides of the LIDAR chip. For example, the TE-polarized component of the laser signal may couple into waveguide 813 and the TM-polarized component of the laser signal may couple into waveguide 815 of the LIDAR chip. Each waveguide may be characterized by a respective height and a respective width, wherein the respective height may vary between 200 nm and 5 µm and the respective width may vary between 200 nm and 5 µm.

The TE-polarized component may be emitted from the facet 814 of the LIDAR chip as the LIDAR output signal. A portion of the TE-polarized component may be tapped into by a directional coupler 816 that couples the portion of the TE-polarized light as a reference signal for comparison with a corresponding TE-polarized LIDAR input signal coupled via waveguide 818. The waveguides 813 and 818 may be separated by a distance D5 for walk-off mitigation purposes as described earlier with respect to FIGS. 5-7. D5 may vary between 50 nm up to 10 µm. Various parameters may affect a selection of D5 including at least one of the range of operation (e.g., short-range<10 m, mid-range 10 m up to 50 m, and long-range>50 m), the wavelength range of operation (e.g., 1200 nm to 1320 nm, 1400 nm to 1590 nm, and 1900 nm to 2100 nm), the chirp duration, the chirp rate, the scanning module 106 parameters, specifications of the lens and/or collimators used to focus the optical signals (e.g., the LIDAR output signal and the LIDAR input signals) to-and-from the LIDAR chip.

The TM-polarized component of the laser signal may couple into waveguide 815 and function as a reference signal for comparison with a corresponding TM-polarized LIDAR input signal coupled via waveguide 819. As described earlier with respect to FIG. 5, the first LIDAR input signal may be split into TE and TM polarized signals based on an off-chip birefringent crystal. The TE and TM polarized components of the first LIDAR input signal may be incident onto the LIDAR chip at facets 820 and 821 or vice-versa. Each facet may be configured to couple the incident signal into its respective waveguide. For example, facet 820 may be configured to couple the TE-polarized component of the first LIDAR input signal into waveguide 818. As another example, facet 821 may be configured to couple the TM-polarized component of the first LIDAR input signal into waveguide 819. The waveguide 819 may be positioned at a distance S3 away from the waveguide 818. The separation S3 may vary between a few microns to 200 µm and be dependent upon the dimensions and/or birefringent properties of the crystal positioned near the light emitting and/or collecting edge of the LIDAR chip.

Each of these signals may then be guided via the respective waveguides into light combining components for comparisons with their respective reference signals of the same polarization state. For example, light combining components 822 and 825 may be configured to generate beat signals that respectively correspond to the TE-polarized state and the TM-polarized state. The detector waveguides 823, 824, 826 and 827 may be similar to the detector waveguides described earlier with respect to FIGS. 2 and 3. The light sensor pairs 828 and 829, and 830 and 831 may be similar to those described earlier with respect to FIGS. 2 and 3. The light sensor pairs may be arrange in the BPD configuration of FIGS. 2 and 3. The electrical signals from each of the light sensors may be transmitted via electrical signals (e.g., 832, 833, 834 and 835) to respective bond pads for interfacing with off-chip electronics, such as TIAs and/or ADCs.

In an alternate embodiment, the TM-polarized component may couple into the waveguide 813 while the TE-polarized component may couple into the waveguide 815. In this case, the LIDAR output signal exiting from facet 814, of the waveguide 813, will be primarily TM-polarized. The waveguide 818 may then receive the TM-polarized component of the first LIDAR input signal via facet 820. The waveguide 819 may receive the TE-polarized component of the first LIDAR input signal via facet 821. The TM and TE polarized components of the first LIDAR input signal may then undergo further processing with their respective reference signals via the corresponding light-combining components 822 and 825.

The LIDAR chip of FIG. 8 may include a control branch (not shown) that is configured to operate similarly to the control branch described with respect to FIG. 2. For example, the control branch may control an operation of the laser 810. The control branch may include a directional coupler that can couple a portion of the laser output from the waveguide 813 into a control waveguide. The coupled portion of the laser output transmitted via the control waveguide can serve as a tapped signal. In some embodiments, other signal-tapping photonic components, such as y-junctions and/or MMIs, may be used in place of the directional coupler.

The control waveguide can carry the tapped laser signal to a control interferometer that splits the tapped signal and then re-combines different portions of the tapped signal that are respectively offset in phase with respect to each other. The control interferometer may be a Mach-Zhender interferometer (MZI) comprising two unequal arms along which the split-up portions of the input signal travel before re-combining (e.g., interfering) towards the end; however, other interferometer configurations may be used. The control interferometer signal output may be characterized by an intensity that is largely a function of the frequency of the tapped laser output. For example, the MZI may output a sinusoidal signal characterized by a fringe pattern.

The sinusoidal signal from the control interferometer can couple into an interferometer waveguide and can function as an input to a control light sensor. The control light sensor may convert the sinusoidal light signal into an electrical signal that can serve as an electrical control signal. Changes to the frequency of the outgoing LIDAR signal will cause changes to the frequency of the control light signal. Accordingly, the frequency of the electrical control signal output from the control light sensor is a function of the frequency of the LIDAR output signal. Other detection mechanisms can be used in place of the control light sensor.

FIGS. 9A and 9B show alternative embodiments for polarization separation of the laser input signal. FIG. 9A shows a laser 910, optics 911 and a birefringent crystal 912. Generally, lasers are configured to emit TE polarized wavelengths. As such, the laser 910 may be configured to emit TE-only polarized light. A plane of emission of the laser 910 is shown to lie in the x-y plane and the direction of laser emission is perpendicular to the plane of emission along the z-direction. By introducing a rotation in the laser 910 about the direction of emission and in the x-y plane, an additional polarization component may be introduced in the laser signal being coupled into the LIDAR chip. For example, by rotating the laser 910 about the z-axis, a TM-polarized component can be introduced in the laser signal. This may eliminate the need for a separate PR. The optics 911 may include lenses and isolator(s) for preventing back reflections into the laser cavity, collimating and/or focusing the laser signal. The birefringent crystal 912 may provide polarization separation of the TE and TM components of the laser signal as described earlier with respect to FIG. 8. Thus, by relying on a rotation of the laser about its emission axis, the polarization separation arrangement of FIG. 9A avoids the use of the PR.

FIG. 9B shows an alternative embodiment for achieving polarization separation of a laser signal. The arrangement may include a laser 913, optics 914, a polarization beam splitter (PBS) 915, mirror 916, and lenses 917 and 918. The laser 913 may be rotated about the emission axis (e.g., z-axis) as described with respect to FIG. 9A. The laser emission may then include a TE and a TM polarized component due to the offsets in the planes of oscillation of the TE and TM electromagnetic waves with respect to the alignment axis of the optics and the PBS. The optics 914 may include an isolator and at least one lens. The laser signal may be directed towards the PBS 915 that performs polarization separation of the TE and TM-polarized components of the laser signal. Mirror 916 may direct the TM-polarized component of the laser signal towards lens 917 for focusing onto a facet of the LIDAR chip. The TE-polarized component of the laser signal may be focused onto a different facet of the LIDAR chip via lens 918. For example, the TE and TM-polarized components may be focused onto facets coupled with waveguides 813 and 815, respectively, of the LIDAR chip of FIG. 8.

Although the imaging system is disclosed in the context of a LIDAR system, embodiments disclosed herein can be used in other applications such as machine vision, face recognition and spectrometry.

The above-described example embodiments may be recorded in non-transitory computer-readable media including program instructions to implement various operations embodied by a processing system. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer readable media may also be a distributed network, so that the program instructions are stored and executed in a distributed fashion. The program instructions may be executed by one or more processors or computational elements. The non-transitory computer readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined by the claims and their equivalents.

The invention claimed is:

1. An electro-optical system for polarization separation, the system comprising:
   a laser configured to generate an output signal;
   a polarization rotator configured to:
      receive the output signal;
      generate a transverse electric (TE) signal associated with the output signal; and
      generate a transverse magnetic (TM) signal associated with the output signal;
   a first birefringent crystal configured to:
      receive the TE signal and the TM signal associated with the output signal; transmit the TE signal at a first angle of refraction; and
      transmit the TM signal at a second angle of refraction;
   a second birefringent crystal configured to:
      receive at least one input signal; and
      generate, based on the at least one input signal, a first polarized portion and a second polarized portion of the at least one input signal; and
   a photonic integrated circuit (PIC) configured to:
      receive, from the first birefringent crystal, the TE signal associated with the output signal;
      receive, from the first birefringent crystal, the TM signal associated with the output signal;
      receive, from the second birefringent crystal and via a first input waveguide, the TE
      portion of the at least one input signal; and
      receive, from the second birefringent crystal and via a second input waveguide, the TM portion of the at least one input signal.

2. The system of claim 1, wherein a first separation distance associated with the first input waveguide and the second input waveguide is based on at least one dimension of the second birefringent crystal.

3. The system of claim 2, wherein the PIC is further configured to:
   receive the TE signal via an output waveguide configured to emit a TE output signal; and
   receive the TM signal via a TM waveguide configured to support a TM optical signal.

4. The system of claim 3, wherein a second separation distance associated with the output waveguide and the TM waveguide is based on at least one dimension of the first birefringent crystal.

5. The system of claim 4, wherein the at least one dimension of the second birefringent crystal corresponds to a length of the second birefringent crystal that is approximately greater than 100 μm and less than 2 mm.

6. The system of claim 5, wherein the first separation distance associated with the first input waveguide and the second input waveguide varies between a few μm and 200 μm.

7. The system of claim 6, wherein the second separation distance associated with the output waveguide and the TM waveguide varies between a few μm and 200 μm.

8. The system of claim 3, wherein the PIC is further configured to:
   generate a first reference signal based on the TE output signal; and
   generate a second reference signal based on the TM optical signal.

9. The system of claim 8, wherein the PIC is further configured to:
   generate a first optical beat signal based on interfering the TE portion of the at least one input signal with the first reference signal; and
   generate a second optical beat signal based on interfering the TM portion of the at least one input signal with the second reference signal.

10. The system of claim 9, wherein the PIC comprises:
    a first multi-mode interference (MMI) device configured to generate the first optical beat signal, and
    a second MMI device configured to generate the second optical beat signal.

* * * * *